ANNULAR SAW WITH CIRCULAR SAFETY GUARD

Original Filed July 25, 1966 2 Sheets-Sheet 1

ANNULAR SAW WITH CIRCULAR SAFETY GUARD

Original Filed July 25, 1966 2 Sheets-Sheet 2

United States Patent Office

Re. 27,716
Reissued Aug. 7, 1973

27,716
ANNULAR SAW WITH CIRCULAR SAFETY GUARD

Ermanno Santilli, Via Virgilio Ramperti 19, Rome, Italy

Original No. 3,438,410, dated Apr. 15, 1969, Ser. No. 567,620, July 25, 1966. Application for reissue Mar. 23, 1971, Ser. No. 127,158
Int. Cl. B27b *5/14, 5/30*
U.S. Cl. 30—389 25 Claims

Matter enclosed in heavy brackets [ ] appears in the original patent but forms no part of this reissue specification; matter printed in italics indicates the additions made by reissue.

ABSTRACT OF THE DISCLOSURE

A circular safety guard for an annular saw, said saw being driven by conical rollers about an imaginary axis. A portion of the tooth periphery of the saw blade is permanently concealed within the saw casing, and nearly all of the rest of the periphery is at first concealed within the guard, a portion of said guard being slidably retractable within the casing to expose the blade teeth as the workpiece advances towards the center of the saw, so as to expose just enough of the tooth periphery to accomplish the desired cutting.

Annular saws are known which rotate about an imaginary or virtual axis and are driven by the friction of a roller acting upon one or both the saw blade faces and produce a saw cut far deeper than the radius of the blade. These saws have generally a large portion of their toothed periphery exposed, wherefore they must be operated with great care due to the accidents they are liable to produce.

One of the advantages of the annular saw of this invention is therefore to provide a greater safety than with the saws of the same type presently used. This is a consequence of the fact that the saw of the present invention is provided with a circular guard which conceals nearly the whole of the saw blade toothed periphery and gradually exposes it only when the workpiece is fed to the saw; the amount of the periphery exposed being adequate for the dimensions of the same workpiece.

Still another advantage of this saw is that it permits the maximum depth of cut achievable with a saw of this type, this being a consequence of the fact that the means for driving and guiding the saw blade are the smallest compatible with the strength and sturdy construction of the tool.

Another advantage is that such heavy workpiece when sawn tends to seize the saw blade between the two parts of the workpiece being swan, can easily be sawn through without any manual aid for keeping the two sawn sections apart one from the other. This is achieved by means of a mobile plate which is located within the inner space of the blade annulus and coplanar with the saw blade which plate becomes inserted in the cut and accompanies the workpiece during its traversing travel, while keeping the two parts of the workpiece apart one from the other.

A further advantage of the saw of this invention is that the annular blade is prevented from vibrating by pairs of rollers which dampen any vibrations of the blade and are located at suitable positions.

Still another advantage of this invention consists of the means for driving the saw blade. This means comprises a conical roller of which a generatrix line engages the blade surface and drives it by friction. The driving roller is fitted slidably on the motor shaft and it is coupled to it by means of a screw thread, so that when the roller is rotated about the shaft, it also moves forward or backward along said shaft. This is so positioned that its axis is directed toward the center of the saw and makes an angle with the blade plane which is equal to the angle between the outer surface on the conical roller and the cone axis. When the motor shaft is rotated for driving the saw, the roller, due to the screw coupling with the motor shaft, will advance towards the saw center until its outer surface contacts the blade surface. At this point any further driving torque of the motor shaft will force the roller surface against the blade surface, the latter being supported by another roller at the outer surface of the blade, whereby the required friction is produced for driving the blade.

The importance of this driving system of the saw blade is in the fact that, while systems used up to now are based on a constant force being applied by the roller on the blade, with the system of this invention, the power is transmitted to the saw with a pressure of the roller against the blade which is automatically adjusted to meet the requirments of the cut to be made.

Another advantage of the saw of this invention consists of the system adopted for guiding the blade to rotate about a fixed imaginary or virtual center. This is achieved by two ways: first, the conical roller, which counteracts the driving roller is provided with a circular projecting ridge midway between the smaller and the larger circumference of the truncated cone which forms said roller. This ridge engages a circular groove along the blade annulus in between the toothed periphery and the inner edge of said annulus. The second means for guiding the blade annulus consists of two or more pairs of conical rollers disposed at suitable distance along the circumference of the blade; the latter being led to pass between the two rollers of each pair. One of these two rollers is provided with a strong projecting rim at the smaller circumference of the cone frustum of which said roller is formed. This rim engages the inner edge of the blade annulus with a clearance of some tenths of a milimeter and compels said blade to follow the circular path, as determined by the position of the two or more pairs of guiding rollers.

Other features and advantages of this invention will become apparent from the following detailed description with reference to the enclosed drawings which illustrate a non-limitative example of the invention.

Figure 1:
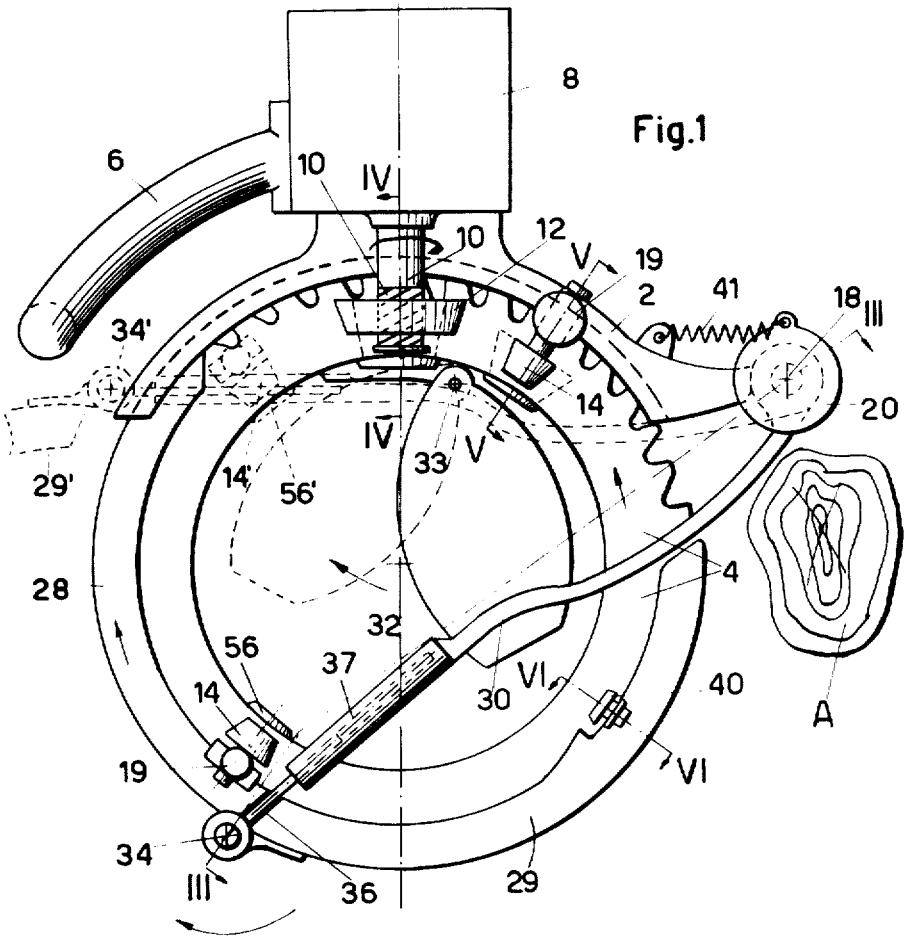
FIG. 1 shows a top plan view of the machine.
Figure 3:
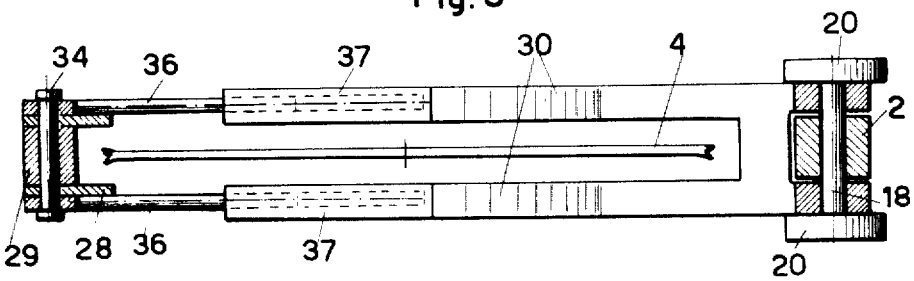
FIG. 3 is a view of the swingable arm for moving the guard of the blade.
Figure 2:
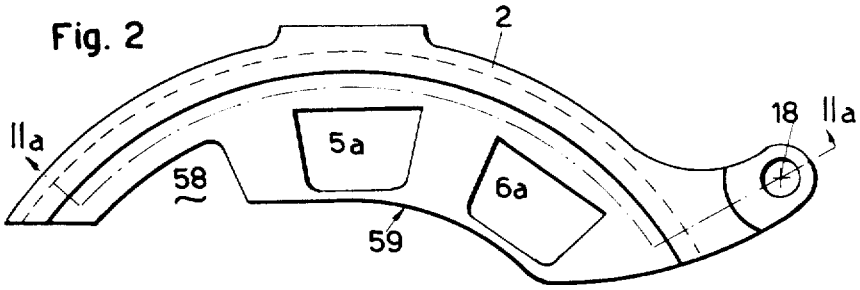
FIG. 2 shows the central portion of the casing.
Figure 2A:
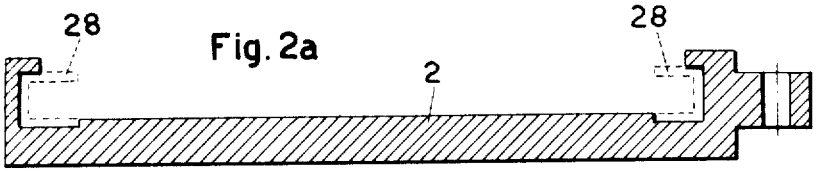
FIG. 2a is a section of the casing along the line II—II of FIG. 2.

With reference to the drawings, casing 2 is shown in FIGS. 1–3 which partially conceals the teeth "m" of the annular saw 4. This casing comprises: a first handle 6, a motor 8, which in this example is an electric motor, the driving means, the means for guiding the blade of the annular saw 4, a pin 18 of arm 30, the mounting brackets of rollers 22 and 14, pin 33 of swingable plate 32 and rollers 20.

A second handle may be placed at a suitable position for holding the tool, taking into account its weight and center of gravity location. The two handles will be provided with pushbutton switches for controlling the motor supply power at the operator's hands convenient reach, thereby contributing to the safety in handling the tool.

As regards the driving means, the electric motor shaft 10, which is disposed along a radius of the saw has a helical groove 10'. On the shaft 10 is mounted a conical roller 12 which engages the saw surface along a generating line of its side surface, due to the axial thrust being imparted on roller 12 by the helical groove 10'.

Because the roller 12 is forced against the saw blade by helical groove 10' and hence the required amount of friction is produced for driving the saw blade, the latter will consequently be forced against the opposing roller 22 which engages the opposite surface of the blade and counteracts the force of roller 12.

The opposing rollers 22 are mounted idle on pins 24 and have a strong terminal rim 26 at the lesser diameter of the cone, which rim functions as a retaining and guiding means for the inner edge of the annular saw 4.

Figure 5:
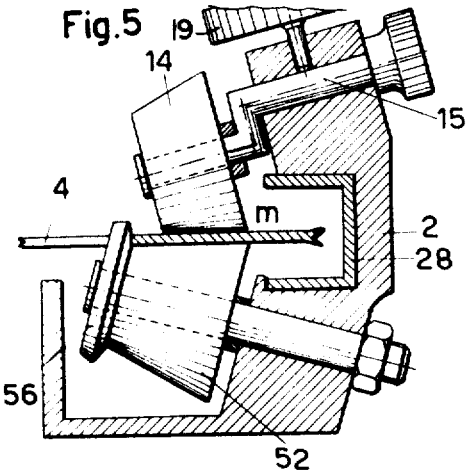
FIG. 5 is a cross-section of the machine casing along the line V—V of FIG. 1. A pair of guiding rollers is shown.

As clearly shown in FIG. 5, roller 14 is mounted on a bayonet pin 15 by which the position of roller 14 with respect to the saw surface may be adjusted. A stop dowel 19 is provided which locks the roller at the required position for producing the required force against roller 52. This unit is mounted inside housing 6*a* of FIG. 2. A similar unit is disposed at the opposite side of the saw blade with respect to the saw center. This second unit is attached to guard 28 which, being connected to arms 30 is moved by it along a circular path.

Rollers 14 of the second unit and the related members being attached to guard 28 are also compelled to follow it along a circular path until it reaches the limit position 14. In this position, the roller does not interfere with casing 2 inasmuch as a recess 58 is provided, in which roller 14 and the related members are received (see FIG. 2). In fact the whole casing 2 is so designed that it constitutes a minimum of obstruction to the advancing workpiece A. To this purpose, the inner edge 59 of frame 2 is profiled with a concavity 58 which faces the saw center.

As shown in FIG. 1, a plate 32 is connected to casing 2 by means of pin 33. A spring, not shown in the drawings, holds plate 32 in the position shown by solid lines in FIG. 1. This plate being slightly thicker than the annular blade and lying on the same plane as the saw blade, follows the latter into the cut and prevents the blade from becoming seized when the walls of the two sections of the workpiece tend to close the cut.

Figure 4:
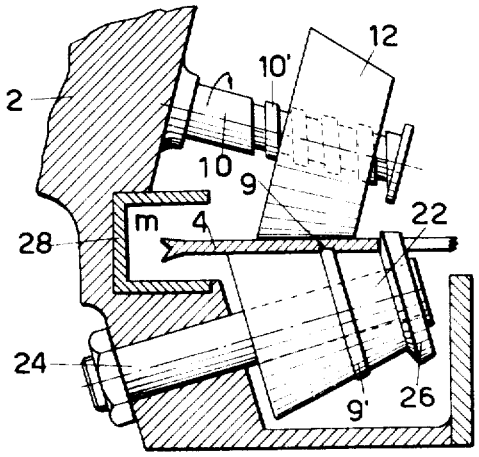
FIG. 4 is a partial cross-section of the machine along line IV—IV of FIG. 1; the driving roller is shown along with its counteracting roller.

As shown by FIGS. 4 and 5, casing 2 is provided with a first guard 28 which performs a most important function for the safety of the operator. First guard 28, in fact is intended for enclosing the saw teeth and for concealing them in order to render them the least accessible. This is achieved by means of a U-section circular channel with which casing 2 is provided along the side thereof which faces the saw teeth. Within this channel first guard 28 can slide with a circular movement under the force applied to pin 34 by arm 30. In fact, arm 30, which is made of two twin parallel members, is mounted swingable about pin 18 at one end, while at the other end it is linked to pin 34 by means of rods 36 which can telescope within an enlarged section 37 of said twin members of arm 30. When the operator forces the tool against a workpiece like that indicated by A in FIG. 1, the workpiece will apply a thrust against arm 30 and swing it about pin 18 against the contrary action of spring 41. As a consequence, arm 30 will move guard 28 to slide along the circular channel of casing 2, said guard being guided by rim 26 of conical roller 22 which rim engages the inner edge of the saw blade.

A second guard 29 completes the protection of the annular saw along the whole of its circumference. This guard is connected to the first guard 28 by means of a hinge 34 and therefore it is compelled to follow it along its movement about the center of the saw blade. When hinge 34 has reached the position indicated with 34' in FIG. 1, guard 28 cannot be moved further along the channel of casing 2, because arm 30 comes to abut against casing 2, at the hinge of pin 18. When the workpiece *a*, at the end of its travel across the saw blade, comes to contact the second guard 29, it forces it to swing about hinge 34; by this way the workpiece can move further. When the workpiece is free from the saw, guard 29 is swung back to its starting position by means of a spring (not shown) which may be wound around hinge 34.

The whole system including guards 28 and 29 and arm 30 is subjected to the action of spring 41, which being under tension during the cutting operation, restores the whole system to the starting state as soon as the cutting has been completed.

On each end of pin 18 a roller 20 is mounted of which the diameter is adapted for forming a rolling support for the workpiece A. The function of these rollers is for supporting the workpiece and facilitating its traversing travel.

Figure 6:
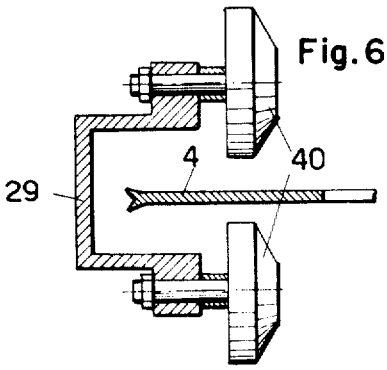
FIG. 6 is a cross-section along line VI—VI of FIG. 1. A pair of rollers for dampening the blade vibration is shown.

With particular reference to FIG. 6, there are shown two rollers 40 attached to guard 29, the function of which is for dampening any blade vibrations, across the blade plane, which vibrations, when wide enough, could cause the blade teeth to shafe the guard and become damaged. Rollers 40 may be of rubber, nylon or any other suitable material.

Any mechanical variant that could be introduced in this machine will be considered to be within the scope of this invention whenever, being based on the same inventive concept, are intended for the same or analogous aims.

What I claim is:

1. An annular saw being driven to rotate about a virtual axis by a conical roller which acts upon a face of the saw blade along a generatrix line of said conical roller, this being counteracted by a second roller mounted idle and acting on the opposite side of the same blade; characterized by the fact that said blade is driven through a motor shaft of which the axis makes with the saw blade plane an angle equal to the angle formed by a generatrix line of the conical roller with the same axis; said motor shaft being provided with a helical groove; a bushing being mounted on said motor shaft, which is also provided with a helical groove adapted for slidably matching the motor shaft groove; said driving conical roller being tightly fitted on said bushing whereby, whenever the motor is started, the driving roller is compelled to advance towards the saw center until it comes to contact the saw blade and to rotate it by friction, a portion of said blade toothed periphery being permanently concealed within the saw casing and nearly the whole of the rest of its periphery being at first concealed within a guard with channel cross-section coaxial with the saw blade and with the casing inner profile; a first portion of said guard being slidably retractable within said casing and a second portion of said guard being swingably attached to said first portion; said guard being so arranged that the workpiece itself, as it advances towards the center of the saw, exposes enough of the saw toothed periphery as required for the workpiece to traverse the saw.

2. An annular saw as per claim 1, wherein, when the saw is not operating, the toothed periphery of the blade annulus is not accessible inasmuch as it is protected by an arcuate guard with channel cross-section; a first portion of said guard being slidable within an arcuate recess with channel cross-section of the saw casing; the latter being provided at one end thereof with a hinge pin to which an arm is connected which can swing about said hinge against the force of a spiral spring; said arm being made of a pair of twin profiled members each of which extends along one side of the saw blade at a distance therefrom and terminates with a hollow section for slidably engaging a cylindrical rod which is connected to said guard by means of a hinge; a second portion of said guard being hinged to the first portion by means of the last mentioned hinge which is provided with a cylindrical spring that tends to keep said second portion in circular alignment with said first section; whereby, as the workpiece is moved transversely to the saw blade, the profiled arm drives the guard to move circularly until the first portion becomes totally concealed within the saw casing and subsequently, when the workpiece comes to contact the second portion of the guard, it forces the latter to swing about said hinge against the force of said spring and completes unobstructedly its traversing travel and thereafter the guard is restored to the starting position by the action of said cylindrical and spiral springs.

3. An annular saw as per claim 1, characterized by the fact that the saw casing is provided at one end with a hinge pin about which an arm is swingable against the force of a spring for accomplishing the function described in the preceding claim, said arm being connected by means of a telescoping coupling to a second hinge attached to the first portion of a circular guard; a second portion of said guard being connected to the same hinge and being swingable about it against the force of a cylindrical spring whereby, when the saw blade is rotating idly, that is with no workpiece applied to it, said guard encloses and protects the toothed saw blade periphery against any contact with the operator's limbs, but as a workpiece is pressed against said arm and moved along it, said guard is partly retracted within said casing and partly swings about said second hinge for exposing said toothed periphery to the advancing workpiece and for permitting it to unobstructedly traverse the saw blade.

4. An annular saw as per claim 1, wherein the means for actuating the guard in order to expose the saw blade toothed periphery is an arm made of a pair of twin profiled members symmetrically disposed at the sides of the saw blade; said arm being articulated to a first hinge integral with the saw casing, while the two profiled members of said arm are connected through telescoping couplings to a second hinge which is attached to a first section of the protecting guard of the saw blade, which second hinge serves also as a turnover hinge for the second section of the guard.

5. An annular saw as per claim 1, characterized by the fact that the saw casing and the saw blade guard are provided each with a pair of conical rollers between which the blade is guided during its rotation; one of the rollers of each pair being mounted on a crank shaft by means of which the roller is moved towards and away from the saw blade and the other roller is provided with a rim at its smaller periphery which rim engages the inner edge of the saw blade annulus with a clearance of a few tenths of millimeter with respect to said edge, whereby the saw blade is prevented from vibrating and is compelled to rotate about a fixed point which is the virtual center of rotation of the blade; said pair of guiding rollers which is attached to the blade guard being moved along a circular path when said guard is retracted within the saw casing under the action of said arm; said second roller, which counteracts the force exerted on the saw blade by the driving roller, being provided midway between the smaller and the larger periphery thereof with a circular projecting ridge which engages a circular groove on the saw blade face on which the driving roller acts, whereby the saw blade is further compelled to rotate about the virtual center of rotation of the saw.

6. An annular saw as per claim 1, characterized by the fact that a plate is provided within the inner space left free within said blade annulus, which plate lies on the same plane as the saw blade and is a few tenths of millimeter thicker than said blade; said plate being swingable about a pin perpendicular to said plane and biased by a spring towards the advancing workpiece, whereby, when the workpiece reaches the wedge-like edge of said plate, this penetrates into the cut and, whenever it becomes pinched between the two parts of the sawn workpiece, it is resiliently swung across the inner space of the blade annulus and ultimately it is restored to the starting position by said spring; whereby the same blade is prevented from being seized between the two parts of the cut.

7. An annular saw as per claim 1, wherein at each end of the first hinge pin a roller is mounted for assisting the traversing travel of the workpiece.

8. An annular saw a per claim 1, wherein the inner edge of the saw casing is profiled with a concavity towards the saw virtual center in order to reduce to a minimum the obstruction of said casing to the advancing workpiece.

*9. An annular saw being driven by a motor coupled to a friction roller which acts on a face of the saw blade to rotate said saw blade by friction characterized by:*

*(a) shaft means on which said roller is mounted coupled to said motor; and*

*(b) complementary means on said roller and said shaft for compelling said roller into friction engagement with face of said saw blade when the motor is rotated to rotate said saw blade.*

*10. An annular saw as defined in claim 9 wherein said roller is conical and acts on the blade along the generatrix line of said conical roller.*

*11. An annular saw as defined in claim 10 wherein said shaft is the motor shaft.*

*12. An annular saw as defined in claim 9 wherein said complementary means are a shaft helical groove on said shaft in slidable matching engagement with a roller helical groove on said roller.*

*13. An annular saw as defined in claim 9 wherein said roller is conical and acts on the blade along the generatrix line of said conical roller, said shaft is the motor shaft, and said complementary means are a shaft helical groove on said shaft in slidable engagement with a roller helical groove on said roller.*

*14. An annular saw as defined in claim 9 which includes in addition a casing on which said motor is mounted, said casing having an inner edge which is profiled with a concavity towards the saw virtual center in order to reduce to a minimum the obstruction of said casing to the advancing workpiece.*

*15. An annular saw being driven by a motor coupled to a friction roller which acts on a face of the saw blade to rotate said saw blade by friction characterized by: a first idler roller acting on the opposite face of said saw to counteract said friction roller, said opposite face having at least one circular groove defined therein, said first idler roller being provided with at least one intermediate projecting ridge which engages said groove and a raised rim at one end to engage the inner edge of said saw blade, and at least one second idler roller having at least one intermediate projecting ridge which engages said groove, and a raised rim at one end to engage the inner edge of said saw blade.*

*16. An annular saw having an annular saw blade which is rotatable about its virtual axis, further characterized by a plate mounted in the same plane as said saw blade, in the space within the saw blade annulus, said plate being dimensioned to fit into the cut of a workpiece to prevent seizure of said saw blade by said workpiece, said plate further being mounted to move within said space within the saw blade annulus when contacted by said workpiece until said plate is restored to its starting position when the saw blade is removed from the workpiece.*

*17. An annular saw as described in claim 16 wherein said plate is resiliently mounted on a saw casing by a pivot hinge to swing in the plane of the saw blade.*

*18. An annular saw as described in claim 16 wherein said plate is a few tenths of a millimeter thicker than said blade.*

*19. An annular saw having a casing in which is mounted a saw blade so that a portion of the toothed periphery is permanently concealed within the casing, further characterized by a guard which normally conceals the rest of the toothed periphery, said guard having a first portion slidably retractably within the casing, and a second portion swingably attached to the free end of said first portion, said guard being so arranged that the workpiece itself, as it advances towards the center of the saw, exposes enough of the saw toothed periphery as required for the workpiece to traverse the saw.*

*20. An annular saw as per claim 19 wherein, when the saw is not operating, the toothed periphery of the blade annulus is not accessible inasmuch as it is protected by an arcuate guard; a first portion of said guard being slidable within the saw casing; the latter being provided at one end thereof with a hinge pin to which an arm is connected which can swing about said hinge against the force of a spring; said arm being made of a pair of twin profiled members each of which extends along one side of the saw blade at a distance therefrom and terminates with a hollow section for slidably engaging a cylindrical rod which is connected to said guard by means of a hinge; a second portion of said guard being hinged to the first portion by means of the last mentioned hinge which is provided with a cylindrical spring that tends to keep said second portion in circular alignment with said first section; whereby, as the workpiece is moved transversely to the saw blade, the profiled arm drives the guard to move circularly until the first portion becomes totally concealed within the saw casing and subsequently, when the workpiece comes to contact the second portion of the guard, it forces the latter to swing about said hinge against the force of said spring and completes unobstructedly its traversing travel and thereafter the guard is restored to the starting position by the action of said cylindrical and spiral springs.*

*21. An annular saw as per claim 19, characterized by the fact that the saw casing is provided at one end with a hinge pin about which an arm is swingable against the force of a spring, said arm being connected by means of a telescoping coupling to a second hinge attached to the first portion of a circular guard; a second portion of said guard being connected to the same hinge and being swingable about it against the force of a cylindrical spring whereby, when the saw blade is rotating idly, that is with no workpiece applied to it, said guard encloses and protects the toothed saw blade periphery against any contact with the operator's limbs, but as a workpiece is pressed against said arm and moved along it, said guard is partly retracted within said casing and partly swings about said second hinge for exposing said toothed periphery to the advancing workpiece and for permitting it to unobstructedly traverse the saw blade.*

*22. An annular saw as per claim 21, wherein at each end of the first hinge pin a roller is mounted for assisting the traversing travel of the workpiece.*

*23. An annular saw as per claim 19, wherein the means for actuating the guard in order to expose the saw blade toothed periphery is an arm made of a pair of twin profiled members symmetrically disposed at the sides of the saw blade; said arm being articulated to a first hinge integral with the saw casing, while the two profiled members of said arm are connected through telescoping couplings to a second hinge which is attached to a first section of the protecting guard of the saw blade, which second hinge serves also as a turnover hinge for the second section of the guard.*

*24. An annular saw as per claim 19 characterized by the fact that the saw casing and the saw blade guard are provided each with at least one pair of conical rollers between which the blade is guided during its rotation; one of the rollers of each pair being mounted on a crank shaft by means of which the roller is moved towards and away from the saw blade and the other roller is provided with a rim at its smaller periphery which rim engages the inner edge of the saw blade annulus, whereby the saw blade is prevented from vibrating and is compelled to rotate about a fixed point which is the virtual center of rotation of the blade; each pair of rollers which is attached to the blade guard being moved along a circular path when said guard is retratced within the saw casing under the action of said arm.*

*25. An annular saw as per claim 19, characterized by the fact that a plate is provided within the inner space left free within said blade annlus, which plate lies on the same plane as the saw blade and is a few tenths of millimeter thicker than said blade; said plate being swingable about a pin perpendicular to said plane and biased by a spring towards the advancing workpiece, whereby, when the workpiece reaches the wedge-like edge of said plate, this penetrates into the cut and, whenever it becomes pinched between the two parts of the sawn workpiece, it is resiliently swung across the inner space of the blade annulus and ultimately it is restored to the starting position by said spring; whereby the same blade is prevented from being seized between the two parts of the cut.*

References Cited

The following references, cited by the Examiner, are of record in the patented file of this patent or the original patent.

UNITED STATES PATENTS

| | | | |
|---|---|---|---|
| 3,221,783 | 12/1965 | Kaltenmark et al. | 143—44 |
| 2,876,809 | 3/1959 | Rentsch et al. | 143—44 X |
| 2,926,709 | 3/1960 | Kaley et al. | 143—159 R |
| 294,221 | 2/1884 | Gorrel et al. | 143—44 |
| 866,508 | 9/1907 | O'Regan | 143—159 R |
| 2,669,264 | 2/1954 | Wilson | 143—159 R |

FRANK T. YOST, Primary Examiner

U.S. Cl. X.R.

30—391